July 29, 1969 J. M. VISSCHER 3,458,098

DEVICES FOR BRAKING TAPE-SHAPED INFORMATION CARRIERS

Filed June 5, 1967 2 Sheets-Sheet 1

INVENTOR.
JOHANNES M. VISSCHER
BY
[signature]
AGENT

July 29, 1969 J. M. VISSCHER 3,458,098

DEVICES FOR BRAKING TAPE-SHAPED INFORMATION CARRIERS

Filed June 5, 1967 2 Sheets-Sheet 2

INVENTOR.
JOHANNES M. VISSCHER

BY

AGENT 3,458,098
DEVICES FOR BRAKING TAPE-SHAPED INFORMATION CARRIERS

Johannes Mattheus Visscher, Emmasingel, Netherlands, assignor, by mesne assignments, to U.S. Philips Corporation, New York, N.Y., a corporation of Delaware Filed June 5, 1967, Ser. No. 643,654
Claims priority, application Netherlands, July 1, 1966, 6609173
Int. Cl. B65h 23/08
U.S. Cl. 226—195 5 Claims

ABSTRACT OF THE DISCLOSURE

A tape brake positioning assembly for magnetic surface recording employing a leaf spring extending in the direction of tape travel and having a brake affixed to one end and a stationary support at the other end. The securing portions of the two ends are symmetrical about a plane which extends orthogonally to the travelling direction of the tape and which, viewed in the travelling direction of the tape, divides the surface of the spring cooperating with the tape into two equal parts. Pressure compensation allows constant brake pressure in that the leaf spring permits rotation of the brake in two planes of rotation.

Figure 1:
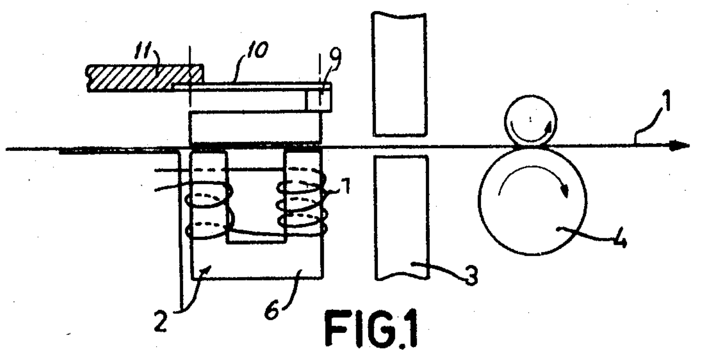

The invention relates to tape recording techniques and particularly to a device for processing, as by braking, a tape-shaped information carrier including one or more members having a surface cooperating with the tape and secured to a leaf spring extending substantially in the travelling direction of the tape.

In positioning a member with respect to a tape where the surface coopearting with the tape is being pressed against the tape, the contact pressure between the tape and the surface must be maintained at a substantially uniform pressure throughout the contacted tape surface area.

This may be achieved in known manner by pivotally connecting the member of which the relevant surface forms a part of a leaf spring. However, the pivotal joint arrangement has a disadvantage in that construction of the member is more complicated and more expensive. Furthermore, the pivot increases the mass of the member, which, with the tape-travelling speeds usual in these devices, results in difficulties with respect to clearance spaces and inertial forces. A futher disadvantage of a pivotal joint is friction and under certain conditions may be aggravated by soiling or bad lubrication, so that the adjustment of the contact surface pressure requires forces which result in a non-uniform contact pressure between the surface and the tape.

The primary object of the present invention is to provide an arrangement in which the contact pressure between the tape and the relevant surface is uniformly distributed throughout the surface. Although primarily intended for braking, the invention could also provide a means for tensioning a moving tape.

In accordance with the invention one end of a leaf spring is secured to the relevant member and its other end supported by a stationary part of the device. The securing points of the two ends are symmetrical about a plane which extends in a direction orthogonally or at right angles to the travelling direction of the tape and which, when viewed in the travelling direction of the tape, divides the surface of the relevant member cooperating with the tape into two equal parts. The main axis of the leaf spring lies in a plane which extends in a direction at right angles to the tape and which, when viewed in a direction at right angles to the travelling direction of the tape, divides the relevant surface into two equal parts.

Thus, a clearance-free suspension of the relevant member is obtained by means of a simple construction having a relatively small mass. Any lack of parallelism between the tape and the surafce is compensated by very small forces through a variation of the position of the relevant member. When using the construction according to the invention, this compensation can be achieved by a rotation of the relevant member about two axes at right angles to one another. These axes substantially intersect in the intersection line of the planes which extend in a direction at right angles to the tape and which, viewed both in the travelling direction of the tape and in a direction at right angles thereto, divide the contacting area or relevant surface of the member into two equal parts. As a result, any lack of parallelism between the surface and the tape is eliminated by a minimum correction of the position of the member. This will be further explained in the description.

In an embodiment according to the invention, each of the members is rigidly secured by one end to the free end of the associated leaf spring, the other end of the leaf spring being secured to a stationary part of the device lying in the same plane as the other side of the relevant surface cooperating with the tape.

Another embodiment of the device in accordance with the invention is characterized in that the free end of the leaf spring is connected by means of a connecting member having a higher degree of rigidity than the leaf spring to one or more points of the relevant member. These points lie substantially in a plane which divides the surface cooperating with the tape into two equal parts when viewed in the travelling direction of the tape.

Figure 2:
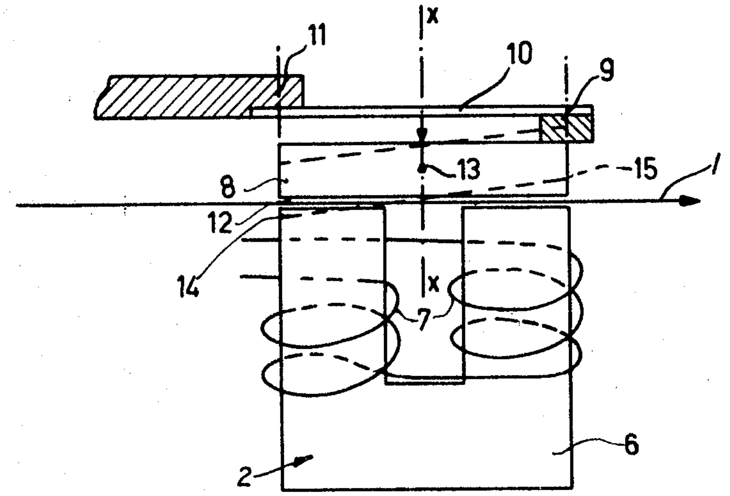
Figure 3:
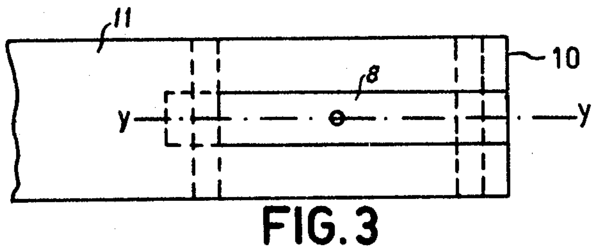
Figure 4:
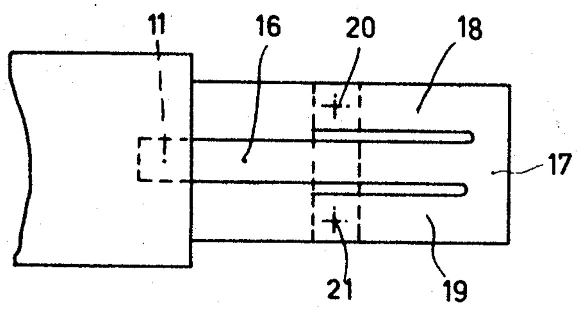
Figure 5:
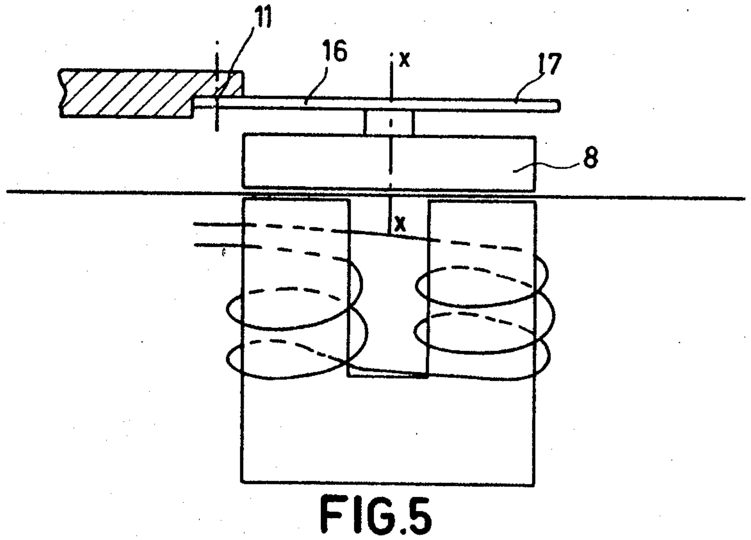

The invention will be described more fully with reference to the drawing, wherein:

FIG. 1 shows diagrammatically and not to scale a device for braking a tape-shaped information carrier, FIGS. 2 and 3 are a sectional view and a plan view, respectively, diagrammatically and not to scale, of a braking device as used in the device of FIG. 1, FIGS. 4 and 5 show in a sectional view and in a plan view, respectively, diagrammatically and not to scale, an alternative embodiment of a braking device.

Referring now to FIG. 1, reference numeral 1 denotes a tape-shaped information carrier. This tape 1 is conducted along a braking device 2 (shown diagrammatically), a reading or writing station 3 (also shown diagrammatically) and transport rollers 4.

FIGS. 2 and 3 show the braking device 2 in greater detail. This braking device comprises a magnet 6 with an energizing winding 7. The magnet 6 cooperates with an armature 8 having the form of a brake block, the tape 1 passing between the armature and the magnet. The armature 8 is secured at 9 to the free end of a leaf spring 10. The leaf spring 10 is secured at 11 to a stationary part of the device. The armature suspension is characterized in that the securing points 9 and 11 are symmetrical about a plane $x—x$ extending in a direction at right angles to the travelling direction of the tape and dividing the surface of the armature 8 which cooperates with the tape into two equal parts. The main axis of the leaf spring lies in the plane $y—y$ which, viewed in the travelling direction of the tape, divides the surface 12 of armature 8 into two equal parts. Due to this suspension, the position of the armature 8 has a flexibility such that the contact pressure between the surface 12 of armature 8 and the tape 1 is substantially uniform throughout the surface. For example, assuming that the surface 12 occupies a position as shown in dotted lines, and if this surface 12 is pressed against the tape by the spring or by another force acting upon the center of the surface 12, produced, for example, by another spring assembly, the armature starts to rotate about the center 13 due to the resilient suspension of the leaf. Therefore, when the angular point 14 moves upwards, the angular point 15 moves towards the tape. Thus, the angular point 14 need be displace only slightly in order to ensure that the surface 12 and the tape 1 engage each other completely, and the difference in contact pressure between the angular point 14 and the angular point 15 will be small. At any rate, the difference in contact pressure will be considerably smaller than in known leaf-spring assemblies wherein no rotation about the center is performed.

The resilient suspension of the armature not only permits rotation about the axis 13 at right angles to the plane of the drawing, but also rotation about the axis *y—y* shown in FIG. 3. Thus, the surface 12 is pressed very uniformly against the tape 1, the differences in contact pressure being very small.

An alternative assembly for securing the brake block 8 is shown in FIGS. 4 and 5. In this case, the leaf spring has a portion 16 with an end threeof secured at 11 to a stationary part of the device which may be above or below the spring. The other end of the leaf spring 16 is provided with a widened portion 17 which in turn supports two spring parts 18 and 19 extending in the direction of the securing point 11. The ends of the parts 18 and 19 are connected at 20 and 21 to the armature acting as brake block 8. The points 20 and 21 lie in the plane of symmetry *x—x* of the surface 19 while the widened portion 17 of the spring and the securing point 11 are evenly spaced from plane *x—x*. Since the spring parts 18 and 19 have a considerably higher degree of rigidity than spring portion 16, the effect of this spring assembly is substantially equal to that of FIGS. 2 and 3. The higher degree of rigidity of the parts 18 and 19 is obtained by a suitable choice of the width of said parts.

Although the above figures only show spring assemblies for securing brake blocks, it will be appreciated that this spring assembly can also be used for suspending reading, writing and erasing heads for magnetic tape, drum or disk storages.

The above cited embodiments are intended as exemplary only, and while I have described my invention with a specific application and embodiment thereof, other modifications will be apparent to those skilled in the art without departing from the spirit and scope of the invention as defined by the appended claims.

I claim:

1. A device for cooperating with a moving tape-shaped information carrier, comprising, a member having a surface for cooperating with the carrier, said member secured to a leaf spring extending substantially in the direction of travel of the carrier, said spring being secured at one end to said member and at the other end thereof to a stationary portion of said device, the securing points of the two ends of said spring being symmetrical about a first plane which extends in a direction at right angles to the carrier, said first plane dividing the carrier contacting surface of said member into two substantially equal parts in the traveling direction of the carrier, the main axis of said leaf spring lying in a second plane at right angles to the carrier, said second plane dividing the surface of said member into two substantially equal parts in a second direction.

2. A device as claimed in claim 1 wherein said member is rigidly secured by one end to the free end of said leaf spring, the other end of said leaf spring being connected to a stationary portion of said device, said portion lying in the same plane as the other side of said member.

3. A device as claimed in claim 1 wherein the free end of the leaf spring is connected by a connecting means, having a higher degree of rigidity than the leaf spring to one or more points of said member, which points substantially lie in the plane which divides the surface cooperating with the tape into two equal parts.

4. A device for selectively braking a moving tape-shaped information carrier, comprising, a braking member having a surface for cooperating with said moving carrier, said braking member having two degrees of rotational movement about first and second mutually orthogonal axes thereof, said first and second axes both lying in a plane parallel to the plane of said carrier, a fixed member, a leaf spring interconnecting said brake member and said fixed member, said spring attached to said brake member at a point on said spring along a line bisecting said leaf spring in the direction of movement of said carrier, and selectively operable means for urging said braking member into contact with said tape, said leaf spring having sufficient flexibility to enable said braking member to rotate about both said axes, thereby to allow the said surface of said braking member to contact said carrier with a contact pressure substantially uniform throughout the said surface.

5. A device for cooperating with a moving tape-shaped information carrier comprising a member having a surface for cooperating with the carrier, said member acting as an armature in cooperation with an electromagnet selectively operable for urging said armature against said carrier, said member secured to a leaf spring extending substantially in the direction of travel of the carrier, said spring being secured at one end to said member and at the other end thereof to a stationary portion of said device, the securing points of the two ends of said spring being symmetrical about a first plane which extends in a direction at right angles to the carrier, said first plane dividing the carrier contacting surface of said member into two substantially equal parts in the travelling direction of the carrier, the main axis of said leaf spring lying in a second plane at right angles to the carrier, said second plane dividing the surface of said member into two substantially equal parts in a second direction.

References Cited

UNITED STATES PATENTS

| | | | |
|---|---|---|---|
| 3,081,014 | 3/1963 | Anderson et al. | 226—195 X |
| 2,094,581 | 10/1937 | Bundick et al. | 242—75.3 X |
| 2,649,294 | 8/1953 | Walter | 267—1 X |
| 2,675,525 | 4/1954 | Wianko | 267—1 X |

FOREIGN PATENTS

| | | |
|---|---|---|
| 917,309 | 1/1963 | Great Britain. |

NATHAN L. MINTZ, Primary Examiner